US005902950A

United States Patent [19]

Kato et al.

[11] Patent Number: 5,902,950

[45] Date of Patent: May 11, 1999

[54] HARMONY EFFECT IMPARTING APPARATUS AND A KARAOKE AMPLIFIER

[75] Inventors: Hirokazu Kato; Takahiro Tanaka, both of Hamamatsu, Japan

[73] Assignee: Yamaha Corporation, Hamamatshu, Japan

[21] Appl. No.: 08/918,016

[22] Filed: Aug. 25, 1997

[30] Foreign Application Priority Data

Aug. 26, 1996 [JP] Japan .................................... 8-224009

[51] Int. Cl.[6] ............................... G09B 5/00; G10H 1/02; G10H 1/36

[52] U.S. Cl. ................................ 84/610; 84/630; 84/631; 84/DIG. 4; 84/DIG. 26; 434/307 A

[58] Field of Search ..................... 84/601, 602, 609–614, 84/625, 630, 631, DIG. 4, DIG. 26; 434/307 A

[56] References Cited

U.S. PATENT DOCUMENTS 5,231,671 7/1993 Gibson et al. .
5,235,124 8/1993 Okamura et al. ..................... 84/631 X
5,301,259 4/1994 Gibson et al. .
5,428,708 6/1995 Gibson et al. .
5,521,326 5/1996 Sone .......................................... 84/631
5,686,684 11/1997 Nagata et al. ............................ 84/631
5,712,437 1/1998 Kageyama ................................ 84/610
5,719,346 2/1998 Yoshida et al. ........................... 84/631
5,732,142 3/1998 Nagata et al. ........................ 84/630 X
5,739,452 4/1998 Nagata ...................................... 84/610
5,741,992 4/1998 Nagata ...................................... 84/631

*Primary Examiner*—Stanley J. Witkowski
*Attorney, Agent, or Firm*—Pillsbury MAdison & Sutro LLP

[57] ABSTRACT

In a karaoke vocal adaptor 100, voice signals to which a harmony effect is imparted by the harmony effect imparting circuit, and voice signals to which the harmony effect is not imparted are output from wet voice output terminals 121 and 122, and dry voice output terminals 111 and 112, respectively. In a karaoke amplifier 200, an echo is imparted only to voice signals input through dry voice input terminals 221 and 222, by an echo imparting unit 233, the voice signals are then mixed with voice signals input through wet voice input terminals 241 and 242, and musical signals input through music input terminals 251 and 252, and the mixed signals are output.

6 Claims, 2 Drawing Sheets

HARMONY EFFECT IMPARTING APPARATUS AND A KARAOKE AMPLIFIER

BACKGROUND OF THE INVENTION

1. Field of the Invention

The invention relates to a harmony effect imparting apparatus and a karaoke amplifier which are used in a karaoke system.

2. Related Art

In a karaoke system, a singing voice (hereinafter, referred to as a vocal sound) which is picked up by a microphone, and a reproduced signal of a music source such as melody and accompaniment sound are mixed with each other by a karaoke amplifier, and then output as a sound from a loudspeaker. Generally, such a karaoke amplifier is provided with a circuit which imparts an echo or reverb to the vocal sound signal input through the microphone, as means for enhancing the stage effect of the singing.

Recently, in addition to such impartation of an echo or reverb, a further special stage effect is requested. In order to comply with such a requirement, various kinds of karaoke vocal adaptors which impart several sound effects to a vocal sound signal have been proposed. When the owner or user inserts such a karaoke vocal adaptor between a microphone and a karaoke amplifier, a desired sound effect can be imparted to a vocal sound produced from a loudspeaker, thereby enhancing the stage effect.

Some of the proposed vocal adaptors have various functions of, for example, so-called vocal conversion in which a vocal sound of a male is converted into that of a female or vice versa, and impartation of a so-called harmony effect in which a harmony sound constituting a consonance with respect to a vocal sound is imparted to the vocal sound. Although a vocal sound on which the former function or the vocal conversion is conducted is obtained as a result of complex processes, it is a so-called dry voice (voice having reverberation components that are relatively small) and is not different from a conventional vocal sound of a male or a female. Therefore even when a vocal sound on which the vocal conversion is conducted by a vocal adaptor is supplied to a karaoke amplifier and an echo or reverb is imparted to the vocal sound by the karaoke amplifier to be output, no difficulty occurs. By contrast, when a vocal sound to which a harmony effect is imparted by the vocal adaptor is supplied to the karaoke amplifier and an echo or reverb is imparted to the vocal sound by the karaoke amplifier, there arises a problem in that the resulting voice signal is reproduced as an obscure sound. This problem arises not only in the case where a harmony effect is imparted to a vocal sound but also in the case where a so-called wet voice (voice having reverberation components that are relatively large) generated by the vocal adaptor is supplied to the karaoke amplifier.

SUMMARY OF THE INVENTION

The invention has been conducted in view of the above-mentioned circumstances. It is an object of the invention to provide a harmony effect imparting apparatus and a karaoke amplifier which, even when the apparatus and the amplifier are combinedly used, can conduct both impartation of a harmony effect or the like to a vocal sound and that of an echo or reverb to the vocal sound without producing the above discussed problem of an obscure sound.

The present invention is provided a harmony effect imparting apparatus comprising: a voice signal input terminal; harmony effect imparting means for imparting a harmony effect to a voice signal input through the voice signal input terminal; a first voice signal output terminal through which the voice signal to which the harmony effect is imparted is output; and a second voice signal output terminal through which the voice signal to which the harmony effect is not imparted is output.

The present invention is provided a karaoke amplifier wherein the amplifier comprising: first and second input terminal through each of which a voice signal is input; a third input terminal through which a musical signal is input, and reverberation imparting means for imparting an echo or reverb to the voice signal input through the first input terminal, wherein an output signal of the reverberation imparting means, the voice signal input through the second input terminal, and the musical signal input through the third input terminal are synthesized with each other to be output.

The present invention is provided a karaoke amplifier further comprises a switch which is selectively operated so as to impart an echo or reverb by the reverberation imparting means to the voice signal input through the first input terminals or not to impart an echo or reverb to the voice signal.

DETAILED DESCRIPTION OF THE PREFERRED EMBODIMENTS

Hereinafter, in order to further facilitate understanding of the invention, embodiments of the invention will be described. The embodiments show modes of the invention, do not restrict the invention, and may be arbitrarily modified within the scope of the invention.

Figure 1:
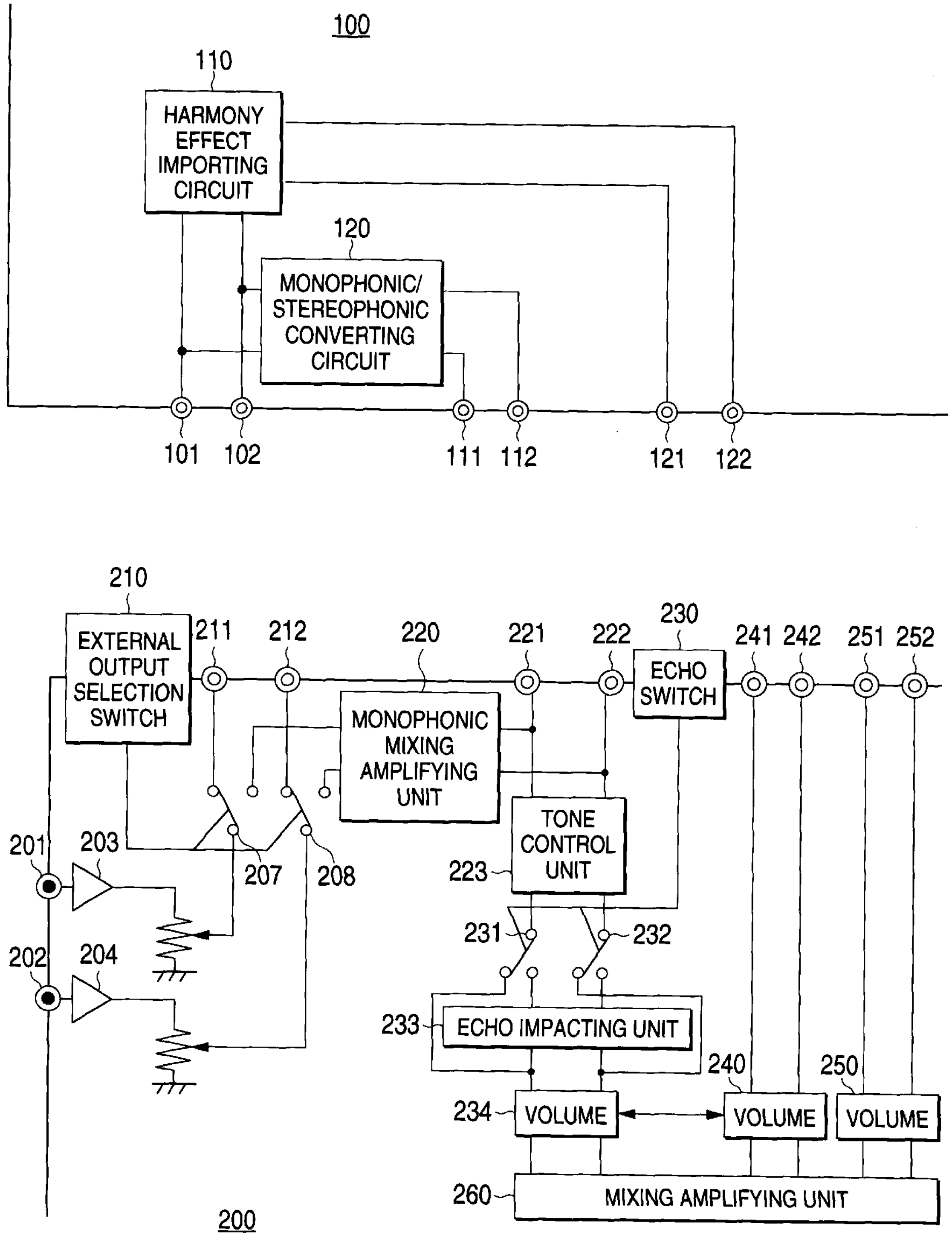
FIG. 1 is a block diagram showing the configuration of a karaoke vocal adaptor and a karaoke amplifier which constitute an embodiment of the invention.

FIG. 1 is a block diagram showing the configuration of a karaoke vocal adaptor 100 which is an embodiment of the harmony effect imparting apparatus of the invention, and a karaoke amplifier 200 which is an embodiment of the karaoke amplifier of the invention.

First, the configuration of the karaoke vocal adaptor 100 will be described. Vocal sound signals obtained through a microphone or the like are supplied to voice input terminals 101 and 102. A harmony effect imparting circuit 110 conducts a pitch shift on the vocal sound signals input through the voice input terminals 101 and 102 to generate harmony sound signals respectively corresponding to harmony sounds which constitute a consonance with respect to vocal sounds. Stereophonic voice signals thereinafter, referred to as wet voice signals) of two or right and left channels in which sound images of the vocal sounds and the harmony sounds are respectively localized at predetermined positions are generated on the basis of the harmony sound signals generated by the pitch shift operation and the original vocal sound signals. The wet voice signals are output through wet voice output terminals 121 and 122.

For example, a method for imparting a harmony effect could be used, which is described in U.S. Ser. No. 08/688, 388 filed by the same assignee of the present invention, and it is possible to employ the material described in U.S. Pat. No. 5,231,671.

The karaoke vocal adaptor 100 has dry voice output terminals 111 and 112 in addition to the wet voice output terminals 121 and 122. A monophonic/stereophonic converting circuit 120 generates stereophonic voice signals (hereinafter, referred to as dry voice signals) of two or right and left channels in which sound images of the vocal sounds are respectively localized at predetermined positions, on the basis of the vocal sound signals input through the voice input terminals 101 and 102. The dry voice signals are output through dry voice output terminals 111 and 112.

In this way, the karaoke vocal adaptor 100 of the embodiment imparts a harmony effect to voice signals, and outputs the voice signals to which the harmony effect is imparted, and those to which the harmony effect is not imparted outputs from the different output terminals. In the embodiment, only the monophonic/stereophonic conversion is conducted on the voice signals to which the harmony effect is not imparted, and the resulting voice signals are output as dry voice signal. Any kind of process may be conducted on the voice signals to which the harmony effect is not imparted and the resulting signals may be output as dry voice signals, as far as no unnatural sense is produced when reverberation is imparted to the signals in a subsequent stage. For example, even when reverberation is imparted to dry voice signals on which a voice quality conversion has been conducted, the resulting signals are not unnatural. Therefore, a voice quality conversion may be conducted on the voice signals to which the harmony effect is not imparted, the monophonic/stereophonic conversion may be conducted on the voice signals which has undergone the voice quality conversion, and the resulting signals may be output through the dry voice output terminals 111 and 112.

Next, the configuration of the karaoke amplifier 200 will be described. Microphones may be directly connected to the karaoke amplifier 200 so that the amplifier handles voice signals input through the microphones. Alternatively, the amplifier may handle the wet and dry voice signals supplied from the karaoke vocal adaptor 100.

First, the configuration relating to the former case or the voice input from microphones will be described. Microphone input terminals 201 and 202 are terminals to which microphones are to be respectively connected. Head amplifiers 203 and 204 amplify voice signals input through the microphone input terminals 201 and 202, respectively. Microphone output terminals 211 and 212 are disposed so as to output the output signals of the head amplifiers 203 and 204 to the outside. A monophonic mixing amplifying unit 220 is a circuit which mixes and amplifies monophonic voice signals.

Switches 207 and 208 are disposed so as to switch over the destinations of the output signals of the head amplifiers 203 and 204. The connections of the switches are changed in an interlocked manner according to the on/off operation of an eternal output selection switch 210.

When the external output selection switch 210 is turned on, the switches 207 and 208 select the microphone output terminals 211 and 212, so that the output signal of the head amplifiers 203 and 204 are output to the outside through the microphone output terminals 211 and 212.

In contrast, when the external output selection switch 210 is turned off, the switches 207 and 208 select the monophonic mixing amplifying unit 220. Under this state, the monophonic mixing amplifying unit 220 receives the output signals of the head amplifiers 203 and 204 through the switches 207 and 208, mines and amplifies the output signals, and outputs the amplified signals as stereophonic voice signals of two or right and left channels in which the sound image is localized at, for example, the center.

The voice signals output from the monophonic mixing amplifying unit 220 are output from loudspeakers which are not shown, through a tone control unit 223 and the illustrated subsequent circuits. The circuits subsequent to the tone control unit 223 will be described later. The circuits related to the voice inputs from the microphones are configured as described above.

Next, circuits which handle the voice signals output from the karaoke vocal adaptor 100 will be described. Furthermore, the configuration of a circuit which handles a musical signal will ba described. A usual karaoke amplifier has only one kind of voice signal input terminals. In contrast, the karaoke amplifier 200 has two kinds of voice signal input terminals, i.e., dry voice input terminals 221 and 222, and wet voice input terminals 241 and 242. When the karaoke amplifier 200 is to be used in combination with the karaoke vocal adaptor 100, the dry voice input terminals 221 and 222 are connected with the dry voice output terminals 111 and 112, and the wet voice input terminals 241 and 242 are connected with the wet voice output terminals 121 and 122.

The tone control unit 223 adjusts the tone colors of the two-channel voice signals supplied through the dry voice input terminals 221 and 222 or from the monophonic mixing amplifying unit 220, and then outputs the voice signals. Switches 231 and 232 which switches over the destinations of the two-channel voice signals are disposed on the output side of the tone control unit 223. The connections of the switches 231 and 232 are changed in accordance with the on/off operation of an echo switch 230.

When the echo switch 230 is turned on, the voice signals output from the tone control unit 223 are supplied to an echo imparting unit 233 through the switches 231 and 232, and an echo is imparted to the signals. In the case where the dry voice input terminals 221 and 222 are connected with the dry voice output terminals 111 and 112 of the karaoke vocal adaptor 100, the voice signals output from the karaoke vocal adaptor 100 are input to the echo imparting unit 233. However, the voice signals are mere dry voice signals which are obtained by converting the vocal sound signals to which the harmony effect is not imparted by the harmony effect imparting circuit 110 into stereophonic signals. Therefore, even when an echo is imparted to the voice signals, the impartation does not cause an obscure sound to be produced.

In contrast, when the echo switch 230 is turned off, the voice signals output from the tone control unit 223 are supplied to a volume 234 through the switches 231 and 232.

The volume 234 receives the voice signals output from the tone control unit 223, or the voice signals to which an echo is imparted as a result of passing through the echo imparting unit 233, and adjusts the levels of the received voice signals. The voice signals are then sent to a mixing amplifying unit 260.

The voice signals input through the wet voice input terminals 241 and 242 are subjected to the level adjustment by a volume 240, and then Sent to the mixing amplifying unit 260. The voice signals input through the wet voice input terminals 241 and 242 are the wet voice signals to which the harmony effect is imparted by the harmony effect imparting circuit 110 of the karaoke vocal adaptor 100. As illustrated, in the karaoke amplifier 200, there is no circuit which imparts an echo or reverb to the wet voice signals. Irrespective of the on/off state of the echo switch 230, therefore, there is no possibility of producing the above-mentioned problem of an obscure sound.

Musical signals such as a melody and an accompaniment sound which are reproduced from a music source (not shown) are supplied to music input terminals 251 and 252. A volume 250 adjusts the levels of the musical signals, and supplies the level-adjusted musical signals to the mixing amplifying unit 260.

The mixing amplifying unit 260 mixes and amplifies the voice signals and musical signals supplied from the volumes 234, 240, and 250, and then supplies the signals to loudspeakers which are not shown.

In the above, the configuration of the karaoke amplifier 200 has been described in detail.

Figure 2:
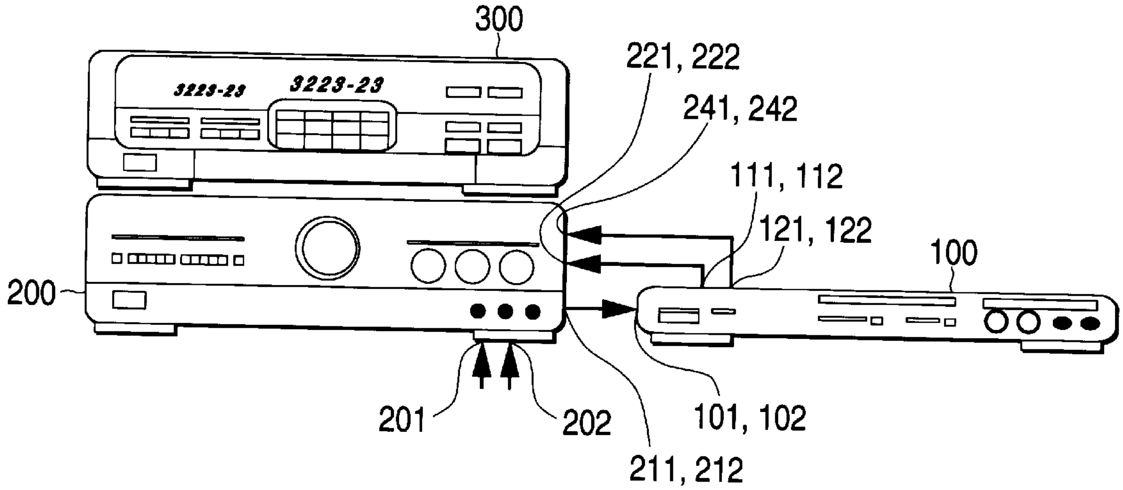
FIG. 2 is a view showing the configuration of a karaoke system in which the karaoke vocal adaptor and the karaoke amplifier are used.
Figure 3:
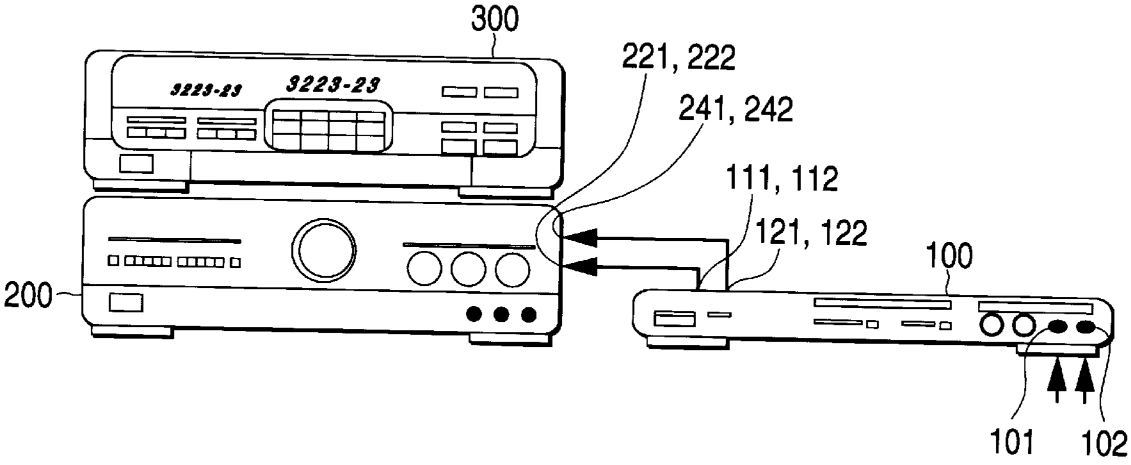
FIG. 3 is a view showing the configuration of another karaoke system in which the karaoke vocal adaptor and the karaoke amplifier are used.

Next, the operation of the embodiment will be described. FIGS. 2 and 3 show examples of a karaoke system in which the karaoke vocal adaptor 100 and the karaoke amplifier 200 of the embodiment are connected to each other, respectively. In the figures, 300 designates a karaoke apparatus which reproduces musical signals such as a melody and an accompaniment sound from a music source.

In the configuration shown in FIG. 2, the external output selection switch 210 (sea FIG. 1) of the karaoke amplifier 200 is turned on (not shown) Voice signals obtained from two microphones (not shown) are supplied to the microphone input terminals 201 and 202 of the karaoke amplifier 200, and then output through the microphone output terminals 211 and 212 to be input to the voice input terminals 101 and 102 of the karaoke vocal adaptor 100.

In the karaoke vocal adaptor 100, the harmony effect is imparted to the voice signals supplied from the karaoke amplifier 200. The stereophonic wet voice signals to which the harmony effect is imparted are output through the wet voice output terminals 121 and 122, and the dry voice signals to which the harmony effect is not imparted are output through the dry voice output terminals 111 and 112.

The dry voice signals are input to the dry voice input terminals. 221 and 222 of the karaoke amplifier 200; and the wet voice signals are input to the wet voice input terminals 241 and 242 of the karaoke amplifier 200. Irrespective of the on/off state of the echo switch 230, the wet voice signals are directly sent to the mixing amplifying unit 260 (FIG. 1) without being subjected to impartation of an echo or reverb, and then mixed with the other signals. In contrast, when the echo switch 230 is turned on, the dry voice signals are subjected to impartation of an echo and then sent to the mixing amplifying unit 260 (FIG. 1). This impartation does not cause the sound to be obscured.

In the configuration shown in FIG. 3, two microphones (not shown) are directly connected to the voice input terminals 101 and 102 of the vocal adaptor 100, the harmony effect is imparted to the voice signals picked up by the microphones, and the wet and dry voice signals are supplied to the karaoke amplifier 200. The configuration can operate in the same manner as that shown in FIG. 2.

In the above, the examples in which the karaoke vocal adaptor 100 and the karaoke amplifier 200 of the embodiment are combinedly used have been described. Alternatively, voice signals output from another vocal adaptor may be input to the dry voice input terminals 221 and 222 of the karaoke amplifier 200. In the alternative, there may arise a case where wet voice signals are output from the vocal adaptor. In this case, the echo switch 230 is turned off so that an echo is not imparted to the voice signals.

As described above, according to the harmony effect imparting apparatus and the karaoke amplifier of the invention, when the apparatus and the amplifier are combinedly used, voice signals to which an effect is imparted, and those to which the effect is not imparted are sent from the harmony effect imparting apparatus to the karaoke amplifier via different paths, and, in the karaoke amplifier, impartation of an echo or reverb is conducted only on the voice signals to which the harmony effect is not imparted. Therefore, both a harmony effect and an echo or reverb can be imparted to a voice signal without obscuring the sound.

What is claimed is:

1. A harmony effect imparting apparatus comprising:

a voice signal input terminal;

a harmony effect imparting circuit for imparting a harmony effect to a voice signal input through said voice signal input terminal;

a wet voice signal output terminal through which the voice signal imparted with the harmony effect by said harmony effect imparting circuit is output; and a dry voice signal output terminal through which the voice signal without imparting the harmony effect by said harmony effect imparting circuit is output.

2. A karaoke amplifier comprising:

a dry voice signal input terminal through which a dry voice signal is input;

a wet voice signal input terminal through which a wet voice signal is input;

a third input terminal through which a musical signal is input; and a reverberation imparting circuit for imparting at least one of an echo and reverb to the voice signal input through said dry voice signal input terminal but not to the voice signal input through said wet voice signal input terminal, wherein an output signal of said reverberation imparting circuit, the voice signal input through said wet voice signal input terminal, and the musical signal input through said third input terminal are synthesized with each other to be output.

3. A karaoke amplifier according to claim 2 further comprising:

a switch selectively operating whether or not to allow at least one of an echo and reverb to be imparted by said reverberation imparting circuit to the voice signal input through said dry voice signal input terminal.

4. A harmony effect imparting apparatus comprising:

a voice signal input terminal;

a harmony effect imparting circuit for imparting a harmony effect to a voice signal input through said voice signal input terminal;

a monophonic/stereophonic converting circuit for generating a stereophonic voice signal based solely on the voice signal input through said voice signal input terminal;

a first voice signal output terminal through which the voice signal imparted with the harmony effect by said harmony effect imparting circuit is output, without passing through the monophonic/stereophonic converting circuit; and a second voice signal output terminal through which the stereophonic voice signal, generated based solely on the voice signal input through said voice signal input terminal, without imparting the harmony effect by said harmony effect imparting circuit is output.

5. A karaoke apparatus comprising:

a first input means for inputting a voice signal;

a harmony effect imparting means for imparting a harmony effect to a voice signal input through said first input means;

a first output means for outputting the voice signal imparted with the harmony effect by said harmony effect imparting means;

a second output means for outputting the voice signal without imparting the harmony effect by said harmony effect imparting means;

a second input means for inputting the voice signal without imparting the harmony effect from the second voice signal output means;

a third input means for inputting the voice signal imparted with the harmony effect from the first voice signal output means;

a fourth input means for inputting a musical signal; and a reverberation imparting means for imparting at least one of an echo and reverb to the voice signal input through said second input means, wherein an output signal of said reverberation imparting means, the voice signal input through said third input means, and the musical signal input through said fourth input means are synthesized with each other to be output.

6. A karaoke apparatus according to claim 5 farther comprising:

a switching means for selectively operating whether or not to allow at least one of an echo and reverb to be imparted by said reverberation imparting circuit to the voice signal input through said second input means.

* * * * *